Figure 1:
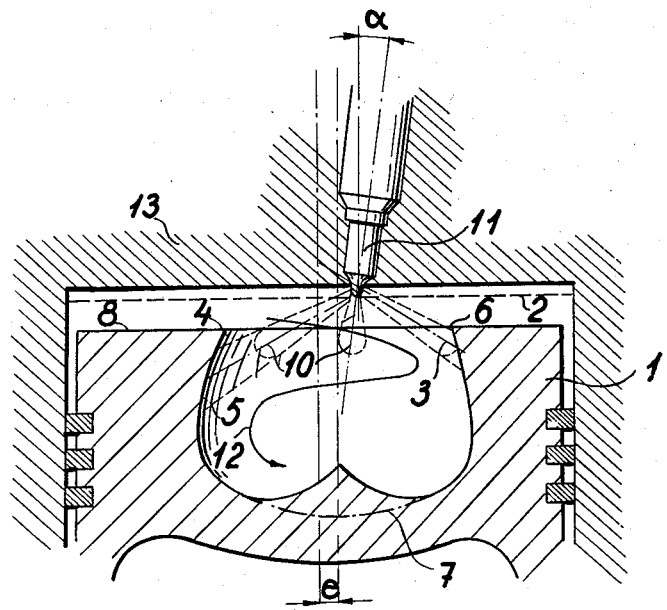

Nov. 8, 1960 J. BÖTTGER 2,959,161
INTERNAL-COMBUSTION COMPRESSION-IGNITION ENGINE
WITH LOCALISED SELF-IGNITION OF THE FUEL
Filed Aug. 14, 1958 2 Sheets-Sheet 1

INVENTOR.
Josef Böttger

United States Patent Office 2,959,161
Patented Nov. 8, 1960

2,959,161

INTERNAL - COMBUSTION COMPRESSION - IGNITION ENGINE WITH LOCALISED SELF-IGNITION OF THE FUEL

Josef Böttger, Prague, Czechoslovakia, assignor to Ustav pro vyzkum motorovych vozidel, Prague, Czechoslovakia Filed Aug. 14, 1958, Ser. No. 755,050

Claims priority, application Czechoslovakia Aug. 20, 1957

12 Claims. (Cl. 123—32)

This invention relates to an internal-combustion engine of the kind operating with direct fuel injection and compression ignition, and comprising a combustion chamber having an ellipsoidal or toroidal shape which is located either in the piston crown or in the cylinder head, and has such a size that at the top dead centre it accommodates almost the entire amount of combustion air, to which a turbulence movement is imparted when required. Usually the fuel is injected in more than two jets of which one impinges with its core against the wall of the combustion chamber closely beneath the edge thereof and with a time lead in relation to the remaining jets. Thus only a small portion of the fuel charge is sprayed over the edge of the opening leading into the combustion chamber.

Such an arrangement has many advantages which are well known. It results in a highly efficient utilization of the air, i.e., in a high brake means effective pressure at a low excess-air coefficient and, above all, in a smokeless and noiseless burning of the air and fuel mixture discharged into the combustion chamber in the direction of the rotating air.

However, the fuel injection in the direction of the rotating air makes it necessary to use with a multicylinder engine either individual heads for each cylinder or masking of the intake valves within the head for a plurality of cylinders, which is a disadvantage. The reason for these measures is this: if the fuel has to be discharged, in the direction of air rotation, the same direction of air rotation must be maintained within all combustion chambers and cylinders, particularly to permit standardization of the injection equipment.

The present invention overcomes the mentioned disadvantage and enables with a similar economical combustion efficiency (i.e. high brake means effective pressure at the smoke limit, and noiseless combustion) the use of the said principles for constructions, in which the combustion chamber is offset with respect to the cylinder axis only to such an extent that an approximately symmetrical air rotation around the axis of the combustion chamber is maintained. According to the invention, the fuel injector, the nozzle of which is preferably provided with more than two symmetrically disposed discharge holes, is offset and inclined in relation to the combustion chamber axis so that the core of one of a plurality of fuel jets impinges almost at right angles to the rotating air movement close below the combustion chamber edge, while a small portion of the envelope of this jet is sprayed over the said edge; the remaining fuel jets then reach the combustion chamber wall with a time delay and at points where the wall temperature is lower than at the point of impingement of the shortest fuel jet spraying over the wall edge. Thus the remaining jets are directed partly in the direction and partly oppositely to the direction of the rotating air. In order to prevent the occurrence of further ignition spots as a result of the fact that some of the jets are directed against the direction of the air turbulence, it is necessary, according to the invention, to limit the offsetting and inclination of the injector axis relative to the combustion chamber axis so the relation between the free length of the shortest jet (ignition jet) and the free length of the longest jet of the remaining fuel jets $$\frac{1 \text{ min.}}{1 \text{ max.}}$$

is not smaller than 1:2.5. Additional self-ignition spots would adversely affect the silent operation of the engine.

For this reason, the fuel injector axis is offset, according to the invention, by a distance $e'$ from the combustion chamber axis, which may again be offset relative to the piston or cylinder axis by the distance $e$. In order to determine an adequate distance $e'$ between the injector axis and the combustion chamber axis, it is recommended to take into account only the relation of two adjacent jets, i.e. the ratio between the free length $l_1$ of the jet adjacent to the ignition jet and the free length $l_0$ of the (shortest) ignition jet. This ratio is between 1.1–1.5 depending on the inclination between the combustion chamber wall and the piston bottom and on the temperature resulting from this inclination in the region of the transfer opening of the combustion chamber. The distance $e'$ is then obtained by evaluating the following formula:

$$e' = r \frac{\left[\left(\frac{l_1}{l_0}\right)^2 - 1\right]}{\left\{1 + \left(\frac{l_1}{l_0}\right)\left[\left(\frac{l_1}{l_0}\right) - 2\cos\beta\right]\right\}}$$

wherein $r$ is the radius of the transfer opening between the combustion chamber and the cylinder space and $\beta$ is the angle between two adjacent jets of the fuel injector usually provided with symmetrically distributed discharge holes in degrees according to the formula $360°/i$, where $i$ is the number of injector-holes.

The inclination of the injector holder is determined in dependence on the size of the combustion chamber and the constructional principles as explained hereinbefore.

Such an arrangement of the fuel injector with respect to the combustion chamber axis requires a multi-hole fuel injector secured in its position in relation to the injector holder, which, in turn must be secured in its position with respect to the axis of the cylinder head.

Figure 2:
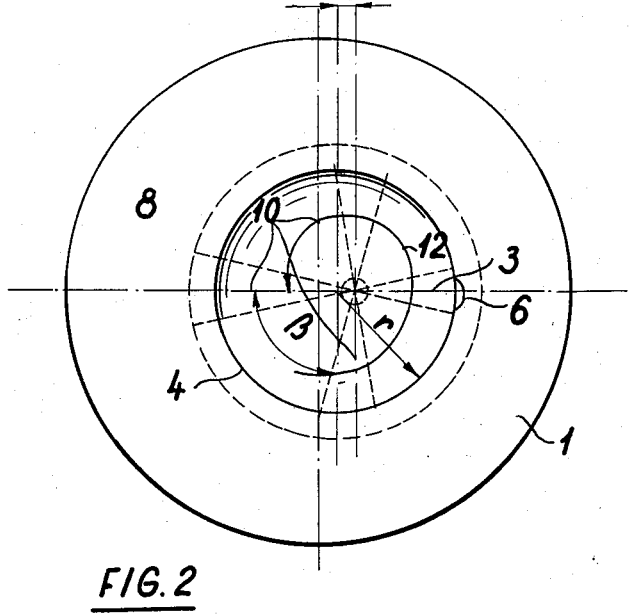
Figure 3:
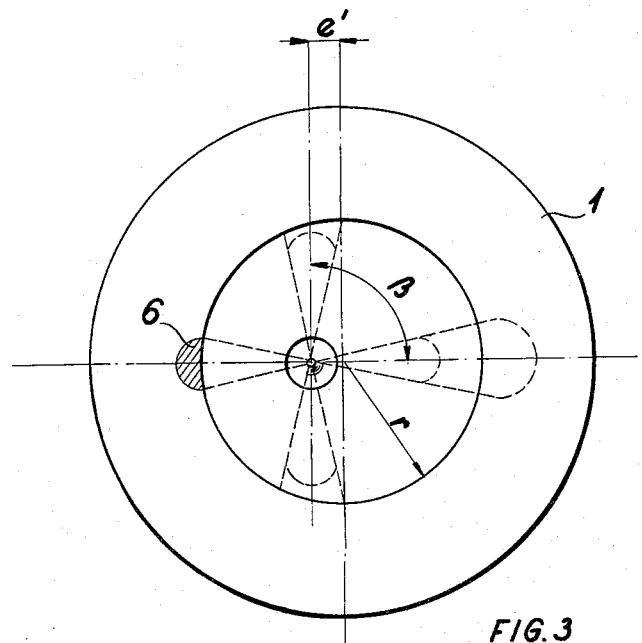
Figure 4:
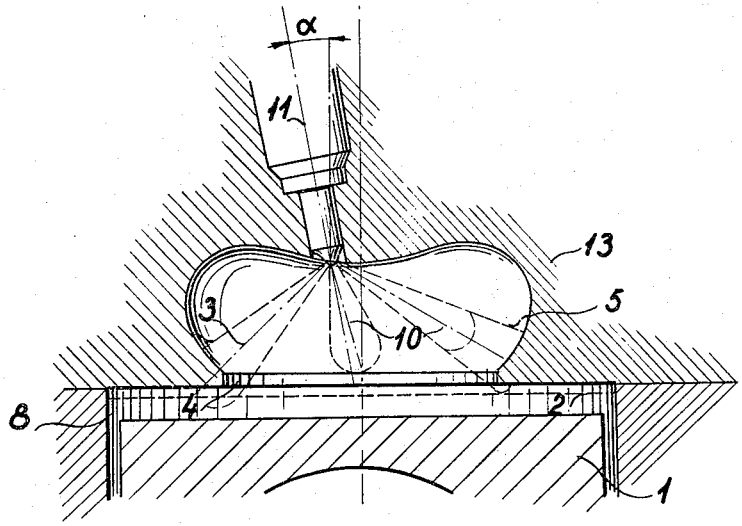

Two embodiments of the invention are illustrated in the drawings, wherein Figs. 1 and 2 show an arrangement with a combustion chamber of toroidal shape located in the piston, and Figs. 3 and 4 show an arrangement with a toroidal combustion chamber located in the cylinder head.

Fig. 1 shows a piston 1 at a distance from the top dead centre position indicated by a dashed line 2, which distance corresponds to the optimum instant when an ignition (shortest) fuel jet 3 impinges on the edge 4 of the combustion chamber wall 5, and a small portion of the fuel from the envelope of the ignition fuel jet 3 flows over the edge 4 at point 6. The combustion chamber 5 may also have the well known shape of an ellipsoid of revolution 7, indicated by dashed line, with a superposed coneshaped opening forming with the top 8 of the piston 1 a sharp edge.

With combustion chambers having the shape of a body of revolution, the edge 4 may be replaced by a cylindrical conical or otherwise curved transfer opening without affecting the results obtainable according to the invention, which only depend on an overspraying to a small extent of the edge 4 of the combustion chamber wall 5. The temperature of the edge 4 is insignificantly affected by the shape of the edge, which can be formed as a sharp edge or a short transfer opening.

The fuel injector 9 in the cylinder head is offset relative to the centre line of the cylinder and is inclined at such an angle α so as to enable a symmetric arrangement around the injector axis 11 of the discharge orifices in the nozzle tip of the injector for an optimum position of remaining fuel jets 10 in relation to the combustion chamber. The optimum number of fuel jets 10 including the ignition jet 3, is determined by the size of the combustion chamber, the intensity of air turbulence and the kind of injection equipment. When the ignition jet 3 reaches the combustion chamber wall 5, the remaining jets 10 are still at a distance from the wall 5, which distance corresponds to the penetrating velocity of the jets 10 in the compressed fluid within the combustion chamber. Before the jets 10 impinge against the combustion chamber wall 5, where self-ignition could take place, the jet 3 is already ignited at one point 6 of its envelope and the flame spreads in direction and through the medium of the rotating air towards the remaining jets 10. The direction of rotation is indicated in both Figs. 1 and 2 by an arrow 12.

The combustion chamber 5 is offset with respect to the centre line of the cylinder through a distance e which distance must not exceed a certain limit determined by maintaining the air rotation within the combustion chamber with smallest radia components. The offsetting of the fuel injector axis 11 is limited by the above mentioned condition that the longest jet 10 must not be longer than 2.5 times the free length of the ignition jet 3.

Figs. 3 and 4 illustrate an embodiment of the invention in which the combustion chamber 5 is located in the cylinder head 13. The shown arrangement relates to a two-stroke engine, in which the valves do not obstruct the location of the combustion chamber within the cylinder head and the scavenging system produces an adequate air rotation within the combustion chamber around its axis.

The difference between the constructions shown in Figs. 3, 4 and 1, 2 respectively consists in that in the latter case the relative position between fuel jets and the wall of the combustion chamber varies during each engine cycle, whilst according to Figs. 3 and 4 the fuel jets are always in the same position relative to the wall of the combustion chamber. When determining the inclination α of the injector axis 11, it is necessary to take this constant relative jet position into account. The ignition jet 3 is also in this case advantageously sprayed over the edge 4 of the short transfer opening of the combustion chamber 5 and a portion of its envelope impinges on the top 8 of the piston 1, which top is made flat to withstand the high heat stress to which it is subjected as a result of the two stroke operation. Nevertheless, it assumes such high temperatures that a quick ignition of the sprayed-over part of the ignition jet envelope 3 is ensured with a time lead before the remaining jets ignite.

If the air turbulence is too small to ensure a satisfactory scavenging effect, it is advisable to arrange the remaining jets 10 so that they too slightly spray over the edge 4 of the transfer opening of the combustion chamber 5, but substantially less than the ignition jet 3. The angle α of the injector axis inclination and the distance e' by which the injector nozzle is offset with respect to the axis of the combustion chamber 5 are determined as has been described hereinbefore. In view of the low intensity of air turbulence, it is advisable to provide a higher number of fuel jets, of which the shortest one is ignited first, while the longest one last. It is true that with such an arrangement the combustion is less silent than that of an engine with intensive air turbulence within the combustion chamber and spraying a single short ignition jet over the edge of the combustion chamber; however, also this arrangement offers the advantage of a marked noise reduction and a satisfactory brake mean effective pressure and combustion efficiency, an advantage of reduced combustion noise at most favourable B.M.E.P. and specific consumption.

What I claim is:

1. In an internal combustion, compression ignition engine, in combination, a cylinder having an axis; a cylinder head on said cylinder having a radially extending face; a piston axially reciprocable in said cylinder and having a top face opposite said cylinder head, one of said faces being formed with a recess having axially extending side walls and having an annular edge opposite the other one of said faces, said recess defining a combustion chamber; and an elongated fuel injector mounted on said cylinder head and having a nozzle tip projecting toward said combustion chamber, said nozzle tip being located eccentrically relative to said annular edge and being formed with a plurality of discharge orifices for emitting respective fuel jets transversely of the direction of elongation of said fuel injector when said piston is in a predetermined position, one of said jets being directed toward the portion of said edge nearest said nozzle tip, and the other jets being directed against said side walls at points thereof spaced from said edge and farther removed from the respective orifices than said nearest edge portion.

2. In an internal combustion, compression ignition engine, in combination, a cylinder having an axis; a cylinder head on said cylinder having a radially extending face; a piston axially reciprocable in said cylinder and having a top face opposite said cylinder head, one of said faces being formed with a recess having axially extending side walls and having an annular edge opposite the other one of said faces, said recess defining a combustion chamber; and an elongated fuel injector mounted on said cylinder head and having a nozzle tip projecting toward said combustion chamber, said nozzle tip being located eccentrically relative to said annular edge and being formed with a plurality of discharge orifices for emitting respective fuel jets substantially symmetrically relative to and transversely of the direction of elongation of said fuel injector when said piston is in a predetermined position, one of said jets being directed toward the portion of said edge nearest said nozzle tip, and the other jets being directed against said side walls at points thereof spaced from said edge and farther removed from the respective orifices than said nearest edge portion.

3. In an internal combustion, compression ignition engine, in combination, a cylinder having an axis; a cylinder head on said cylinder having a radially extending face; a piston axially reciprocable in said cylinder and having a top face opposite said cylinder head, one of said faces being formed with a recess having axially extending side walls and having an annular edge opposite the other one of said faces, said recess defining a combustion chamber; and an elongated fuel injector mounted on said cylinder head and having a nozzle tip projecting toward said combustion chamber, said nozzle tip being located eccentrically relative to said annular edge and being formed with a plurality of discharge orifices for emitting respective fuel jets transversely of the direction of elongation of said fuel injector when said piston is in a predetermined position, one of said jets being directed toward the portion of said edge nearest said nozzle tip, and the other jets being directed against said side walls at points thereof spaced from said edge and not more than 2.5 times farther removed from the respective orifices than said nearest edge portion.

4. In an internal combustion, compression ignition engine, in combination, a cylinder having an axis; a cylinder head on said cylinder having a radially extending face; a piston axially reciprocable in said cylinder and having a top face opposite said cylinder head, one of said faces being formed with a recess having axially extending side walls and having an annular edge opposite the other one of said faces, said recess defining a combustion chamber having an axis substantially parallel to the axis of said cylinder and an arcuate cross-section for rotary movement of air in said combustion chamber about said axis in a predetermined direction; and an elongated fuel injector mounted on said cylinder head and having a nozzle tip projecting toward said combustion chamber, said nozzle tip being located eccentrically relative to said annular edge and being formed with a plurality of discharge orifices for emitting respective fuel jets transversely of the direction of elongation of said fuel injector when said piston is in a predetermined position, one of said jets being directed toward the portion of said edge nearest said nozzle tip, and the other jets being directed against said side walls at points thereof spaced from said edge and farther removed from the respective orifices than said nearest edge portion, one of said other jets being directed substantially in said predetermined direction, and another one of said other jets being directed substantially in a direction opposite to said predetermined direction.

5. In an internal-combustion engine according to claim 1, said combustion chamber having toroidal shape.

6. In an internal-combustion engine according to claim 1, said combustion chamber having a heart-like shape.

7. In an internal-combustion engine according to claim 1, said combustion chamber being disposed in the top face of said piston.

8. In an internal-combustion engine according to claim 1, said combustion chamber being disposed within said cylinder head.

9. In an internal-combustion engine according to claim 1, said combustion chamber having an axis offset with respect to the axis of the cylinder.

10. In an internal-combustion engine according to claim 1, the longitudinal axis of the fuel injector being inclined with respect to the axis of said cylinder so that said points of said side walls are not more than 2.5 times farther removed from the respective orifices than said nearest edge portion.

11. In an internal combustion, compression ignition engine, in combination, a cylinder having an axis; a cylinder head on said cylinder having a radially extending face; a piston axially reciprocable in said cylinder and having a top face opposite said cylinder head, one of said faces being formed with a recess having axially extending side walls and having an annular edge opposite the other one of said faces, said recess defining a combustion chamber; and an elongated fuel injector mounted on said cylinder head and having a nozzle tip projecting toward said combustion chamber formed with a plurality of discharge orifices for emitting respective fuel jets transversely of the direction of elongation of said fuel injector when said piston is in a predetermined position, one of said jets being directed toward a portion of said edge, and the other jets being directed against said side walls at points thereof spaced from said edge and farther removed from the respective orifices than said edge portion.

12. In an internal combustion, compression ignition engine, in combination, a cylinder having an axis; a cylinder head on said cylinder having a radially extending face; a piston axially reciprocable in said cylinder and having a top face opposite said cylinder head, one of said faces being formed with a recess having axially extending side walls and an annular edge opposite the other one of said faces, said recess defining a combustion chamber; and an elongated fuel injector mounted on said cylinder head and having a nozzle tip projecting toward said combustion chamber, said nozzle tip being located eccentrically relative to said annular edge and being formed with a plurality of discharge orifices for emitting respective fuel jets transversely of the direction of elongation of said fuel injector when said piston is in a pedetermined position, one of said jets being directed toward the portion of said edge nearest said nozzle tip, and the other jets being directed against said side walls at points thereof farther removed from the respective orifices than said nearest edge portion, said discharge orifices being so arranged that said one jet spreads over said edge with less than half of the envelope thereof, while said other fuel jets, which are directed against said side wall of the combustion chamber, are substantially retained in said combustion chamber.

References Cited in the file of this patent

UNITED STATES PATENTS

| | | |
|---|---|---|
| 2,205,493 | Saurer | June 25, 1940 |
| 2,720,870 | Grob | Oct. 18, 1955 |
| 2,837,068 | Lang | June 3, 1958 |
| 2,851,019 | Fleming | Sept. 9, 1958 |